United States Patent Office 3,262,313
Patented July 26, 1966

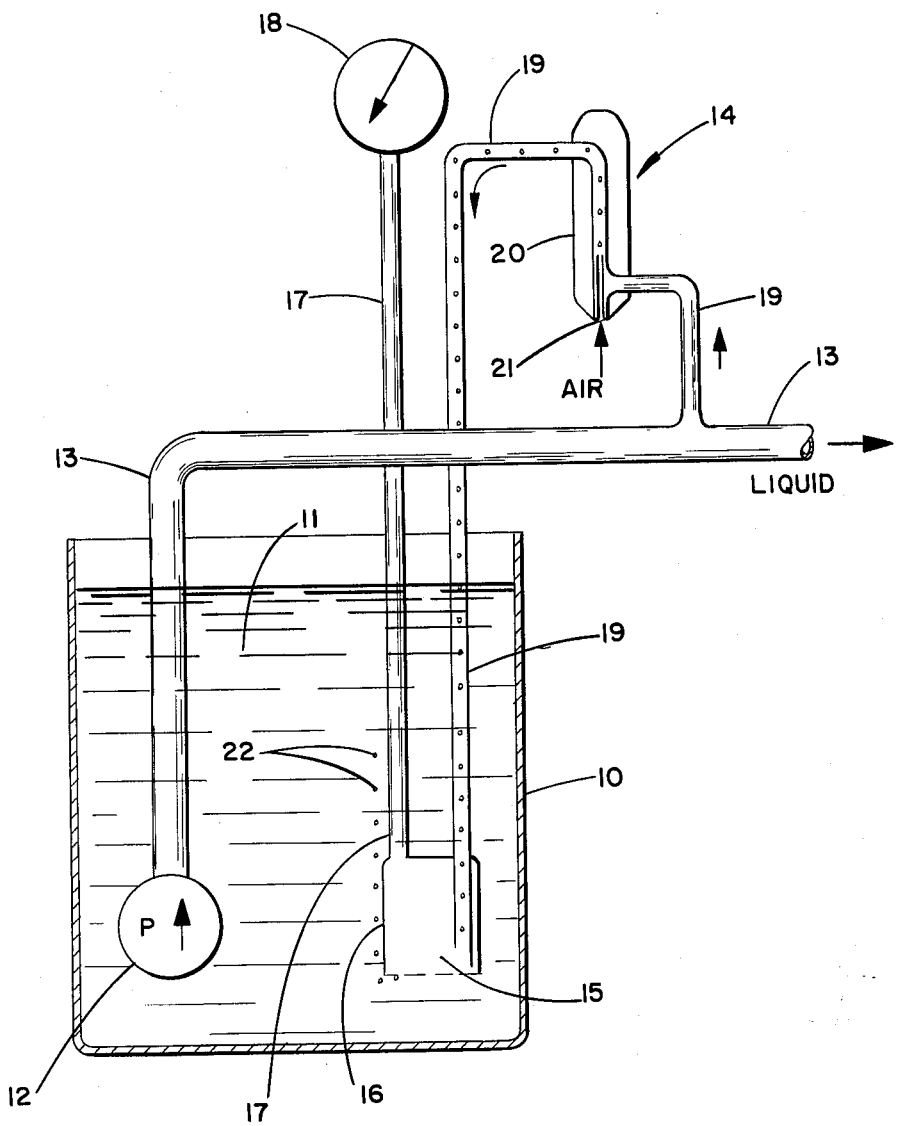

3,262,313
PRESSURE CHAMBER LEVEL GAUGE WITH BUBBLE SUPPLY
Archibald Leland Hanna, Foxboro, Mass., assignor to The Foxboro Company, Foxboro, Mass., a corporation of Massachusetts
Filed Nov. 9, 1964, Ser. No. 409,628
2 Claims. (Cl. 73—302)

This invention relates to pressure opposing systems such as devices for direct contact opposition of liquid and gas, or any aeriform fluid bodies.

The illustrative example of this invention is in the form of a liquid level measuring system, of the bubble tube type.

The usual form of liquid level bubble tube system introduces air under pressure beneath the surface of a liquid body. The air pressure necessary to push air into the liquid so that it bubbles up, is representative of the head of liquid, and thus the liquid level.

Often, such liquid bodies are water supplies, with pumps for pushing water through an outlet pipe. In many instances it is undesirable and unduly expensive to provide air supply means, such as a compressor, to provide the bubble system.

This invention provides new and useful means for supplying aeriform fluid bubbles to a liquid-pressured chamber by means of a liquid carrier.

As an example, this invention provides liquid level measuring means with a bubble system comprising a fluid flow aspiration of air to deliver bubbles to a pressure chamber.

It is an object of this invention to provide a new and useful pressure chamber system, for example, a new and useful liquid level measurement system.

It is a further object of this invention to provide a liquid level bubble tube measurement system including a bubble supply through aspiration by liquid flow.

Other objects and advantages of this invention will be in part apparent and in part pointed out hereinafter and in the drawing.

The drawing is a schematic illustration of an illustrative embodiment of a liquid level measuring system according to this invention.

In the drawing, the illustrative system relates to liquid level measurement in a well or tank 10, with a body of liquid 11 therein. In a suitable application of this invention, the well contains water by seepage, or by other suitable supply such as an input pipe (not shown) from some other, larger source of water.

In water supply systems, for example municipal systems, it is important to have knowledge of the water level by means of simple and dependendable apparatus.

There is ordinarily a water pump as at 12, often located within the body of water as shown, with this pump provided to produce a water output, as through output pipe 13. Such an output is used, for example, to supply municipal water consumer systems.

In previous bubble tube liquid level systems it has been necessary to have a separate power source in the form of a body of compressed air, with attendant air compressor.

Such air devices supplied air under pressure to a selected depth within the water well. The pressure necessary to force air therethrough so as to rise as bubbles in the liquid provided representation of the head of liquid, indicative of the water level in the well.

In the present invention, air for a bubble system is provided by an aspirator unit 14, and compressed air facilities are not needed.

In the drawing, an air chamber 15 is provided by means of an inverted cup 16, located within the body of liquid 11 at a specific distance above the bottom of the tank. Thus there is a known head of liquid between the bottom of the cup 16 and the bottom of the tank 10. This value may be added to any reading of liquid level measurement variant accomplished by this system.

A pressure pipe 17 opens into the cup 16 at the top of the cup and leads to a suitable pressure indicator unit 18 to indicate the pressure of the air body 15. This indicator may be suitably calibrated to take into account the additional head between the bottom of the cup 16 and the bottom of the tank. Air bubbles are supplied to the cup 16 through a vertical input pipe 19 from the aspirator 14. This is done with air bubbles carried in a liquid stream, in this instance water.

The pump 12 provides a stream of water in the output pipe 13. From this pipe there is a diverging pipe 19 leading to the aspirator 14.

The aspirator is mounted in any suitable form of housing, as indicated at 20, and is provided with an air inlet 21 to the pipe 19.

Water is pumped from the tank 10 up to the aspirator. The result is a stream of water through the input pipe 19 into the air chamber 15 in the cup 16. As this stream of water passes the inner end of the air inlet 21 in the aspirator, air bubbles are drawn into the water stream and are carried by this stream down into the cup 16. Thus the bubble system is a liquid stream carrying air bubbles.

In the inverted cup 16, the air bubbles build up until there is sufficient pressure to force the water down to the bottom of the cup. At this point, the air bubbles escape from the cup, as indicated at 22, and rise to the top of the liquid. Now the air pressure in the cup 16 balances the head of liquid above the bottom of the cup and represents the level of the water in the tank. This representation is shown by the indicator 18.

The flow of water and air bubbles down within the pipe 19 is accomplished by the head or weight of liquid in the pipe 19. This is established as being substantially greater than any expected head in the water in the tank 10.

The weight of the water in the pipe 19 varies as this head of liquid becomes more or less full of bubbles. It may come to the point where this weight is insufficient to drive the fluid in pipe 19 at the velocity necessary to continue the aspiration and therefore, momentarily, no further air bubbles will be drawn. When this occurs, the solid water stream in the pipe 19 continues and flushes out the air in the pipe 19 and starts again to draw bubbles from the air intake 21.

This fluctuation of the amount of air in the pipe 19 is buffered by the air capacity in the cup 16 so the indicator 18 need not show representations of the fluctuation. Also the fluctuation in the amount of air in the air bubbles in the pipe 19 may be a matter of degree. It may not entirely come to the point where there are no air bubbles at all. It may be a change over a range of bubble content. This results in a variant in the head or weight of water in the pipe 19 increasing and decreasing and clearing and renewing itself according to its abilities to draw air through the aspirator intake 21.

Under some circumstances it may be desirable to utilize direct pressure of fluid flow to aspirate and carry air bubbles into the cup 16 rather than depend on the head or weight of water in the pipe 19. In the present instance the force necessary to carry bubbles into the cup 16 is provided by the head of water in the vertical portion of the input pipe 19.

The pressure signal from the chamber 16 can be applied to other devices besides the indicator 18, for example, a recorder.

This invention therefore provides a new and useful bubble tube type of liquid level measuring system as an application comprising a pressure chamber to which an aeriform fluid is provided by an aspirator.

As many embodiments may be made of the above invention, and as changes may be made in the embodiments set forth above without departing from the scope of the invention, it is to be understood that all matter hereinbefore set forth or shown in the accompanying drawing is to be interpreted as illustrative only and not in a limiting sense.

I claim:

1. A liquid level measurement system comprising a tank, an air chamber in the form of an inverted cup for location within a liquid body in said tank, at a selected depth therein, pressure take-off means connected into said air chamber, a fluid outlet pipe from said tank, means for moving liquid from said tank through said outlet pipe, a feedback pipe from said outlet pipe back into said air chamber, and aspirator means from atmosphere into said feedback pipe, whereby a flow of liquid is produced from said tank through said outlet and back to said tank through said feedback pipe during said outlet flow, as an air bubble entrainment system from atmosphere to said air chamber.

2. A liquid level measurement system comprising a tank for containing liquid, a liquid outlet pipe from a location deep in said tank, means for pumping liquid from said tank out through said outlet pipe, a branch liquid take-off pipe from said outlet pipe, aspirator means in said branch pipe providing an open air connection from atmosphere to said branch pipe, a bubble tube as a continuation of said branch pipe, said bubble tube extending back down deep into said liquid tank, whereby a flow of liquid is produced from said tank through said outlet and back to said tank through said feedback pipe during said outlet flow, as an air bubble entrainment system from atmosphere to said air chamber, an inverted air cup deep in said liquid tank, with said bubble tube entering said air cup through the top thereof and terminating within the confines of said cup, an air pressure take-off pipe extending from top of said air cup, and a pressure indicator on said air pressure take-off pipe.

References Cited by the Examiner

UNITED STATES PATENTS

| | | | |
|---|---|---|---|
| 899,820 | 9/1908 | Abbott | 230—92 |
| 2,542,168 | 2/1951 | Voleau | 73—302 |
| 3,047,267 | 7/1962 | Peyrin | 230—92 X |

FOREIGN PATENTS

| | | |
|---|---|---|
| 686,029 | 4/1930 | France. |
| 1,166,720 | 6/1958 | France. |

LOUIS R. PRINCE, *Primary Examiner.*

DAVID SCHONBERG, *Examiner.*

F. H. THOMSON, *Assistant Examiner.*